(12) United States Patent
Dillahunt et al.

(10) Patent No.: US 9,395,199 B2
(45) Date of Patent: Jul. 19, 2016

(54) DYNAMIC ROUTING VIA INTELLIGENT MAPPING SYSTEM

(75) Inventors: Tawanna R. Dillahunt, Pittsburgh, PA (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 13/618,982

(22) Filed: Sep. 14, 2012

(65) Prior Publication Data

US 2013/0013191 A1    Jan. 10, 2013

Related U.S. Application Data

(63) Continuation of application No. 13/073,524, filed on Mar. 28, 2011.

(51) Int. Cl.
| | |
|---|---|
| *G08G 1/123* | (2006.01) |
| *G01C 21/12* | (2006.01) |
| *G01C 21/34* | (2006.01) |
| *G01C 21/36* | (2006.01) |
| *G06Q 30/06* | (2012.01) |

(52) U.S. Cl.
CPC .......... *G01C 21/343* (2013.01); *G01C 21/3415* (2013.01); *G01C 21/362* (2013.01); *G06Q 30/0639* (2013.01)

(58) Field of Classification Search
None
See application file for complete search history.

(56) References Cited

U.S. PATENT DOCUMENTS

| | | | |
|---|---|---|---|
| 7,756,757 B1 | 7/2010 | Oakes, III | |
| 2002/0069131 A1* | 6/2002 | Miyata | G06Q 10/06 705/26.9 |
| 2002/0138327 A1* | 9/2002 | Mello | G06Q 10/06 705/7.15 |
| 2005/0222762 A1 | 10/2005 | Hamilton et al. | |
| 2006/0059049 A1* | 3/2006 | Morris | G06Q 30/0601 705/26.1 |
| 2006/0235856 A1 | 10/2006 | Halcrow et al. | |
| 2008/0004926 A1 | 1/2008 | Horvitz et al. | |
| 2008/0154720 A1* | 6/2008 | Gounares et al. | 705/14 |
| 2009/0005964 A1 | 1/2009 | Forstall et al. | |
| 2009/0143977 A1 | 6/2009 | Beletski et al. | |
| 2009/0144181 A1 | 6/2009 | Rani | |
| 2009/0210143 A1* | 8/2009 | Seltzer et al. | 701/200 |
| 2010/0027527 A1 | 2/2010 | Higgins et al. | |

(Continued)

FOREIGN PATENT DOCUMENTS

| | | |
|---|---|---|
| WO | 0111523 | 2/2001 |
| WO | 2008002127 A1 | 1/2008 |
| WO | 2009065638 | 5/2009 |

OTHER PUBLICATIONS

U.S. Office Action mailed Jan. 23, 2013 in related U.S. Appl. No. 13/073,524.

(Continued)

*Primary Examiner* — Ariel Yu
(74) *Attorney, Agent, or Firm* — Scully, Scott, Murphy & Presser, P.C.; Mercedes L. Hobson, Esq.

(57) ABSTRACT

Enabling dynamic routing or mapping information, or combinations thereof, based on one or more user specified tasks may include determining one or more locations where one or more user specified tasks can be accomplished and dynamically determining at least one of routing and mapping information from current location of a user to said one or more locations.

15 Claims, 4 Drawing Sheets

(56) References Cited

U.S. PATENT DOCUMENTS

2010/0145569 A1    6/2010   Bourque et al.
2010/0280748 A1    11/2010  Mundinger et al.

OTHER PUBLICATIONS

International Search Report dated Jul. 4, 2012 in related International Application No. GB1203928.5.

U.S. Office Action mailed Jun. 21, 2013 in related U.S. Patent Appl. No. 13/073,524.

Office Action dated Sep. 16, 2014 received in the parent application, namely, U.S. Appl. No. 13/073,524.

Office Action dated Sep. 16, 2015 received in the parent application, namely, U.S. Appl. No. 13/073,524.

* cited by examiner

DYNAMIC ROUTING VIA INTELLIGENT MAPPING SYSTEM

RELATED APPLICATIONS

This application is a continuation of U.S. application Ser. No. 13/073,524, filed Mar. 28, 2011.

FIELD

The present application relates generally to computers and applications, and more particularly to enabling dynamic routing.

BACKGROUND

Applications that use global positioning system (GPS) may provide routes to specific destinations and addresses. Those applications, however, do not take into account the specific activity needed for, or the purposes of, getting to the destinations. For example, to purchase an iPhone™, a user may search for "Apple" in their GPS applications for Apple™ stores but fail to consider other places that may sell iPhones, for example, AT&T stores; however, the purpose or the activity needed in searching for the Apple store is to purchase a phone.

Existing applications that provide routes also do not take into account factors such as the current inventory, status of stores, or efficiency, current traffic, weather, or other environmental conditions that may impact the overall length and efficiency of the trip while in transit or in the process of performing a list of tasks. That is, the existing systems are not enabled to provide "smart-routes" based on the current state of the environment or other factors, or which errand makes sense to complete first in order to accomplish a task specified by users. Rather, the alternative that may exist includes checking stores online and/or calling to confirm inventory, current weather conditions, traffic conditions to help determine which route to take. Users may also check preferences (as specified by user ratings) via online Web sites such as Yelp™ However, those alternatives still do not provide dynamic updates while en-route (on the way).

BRIEF SUMMARY

A method and system for enabling dynamic routing may be provided. The method, in one aspect, may include receiving one or more user specified tasks and determining one or more locations where said one or more user specified tasks can be accomplished. The method may also include dynamically determining at least one of routing and mapping information from current location of a user to said one or more locations.

A system for enabling dynamic routing, in one aspect, may include a location receiver and transmitter and an input module operable to receive one or more user specified tasks. A routing manager module may be operable to determine one or more locations where said one or more user specified tasks can be accomplished, and further dynamically determine at least one of routing and mapping information from current location of a user to said one or more locations.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
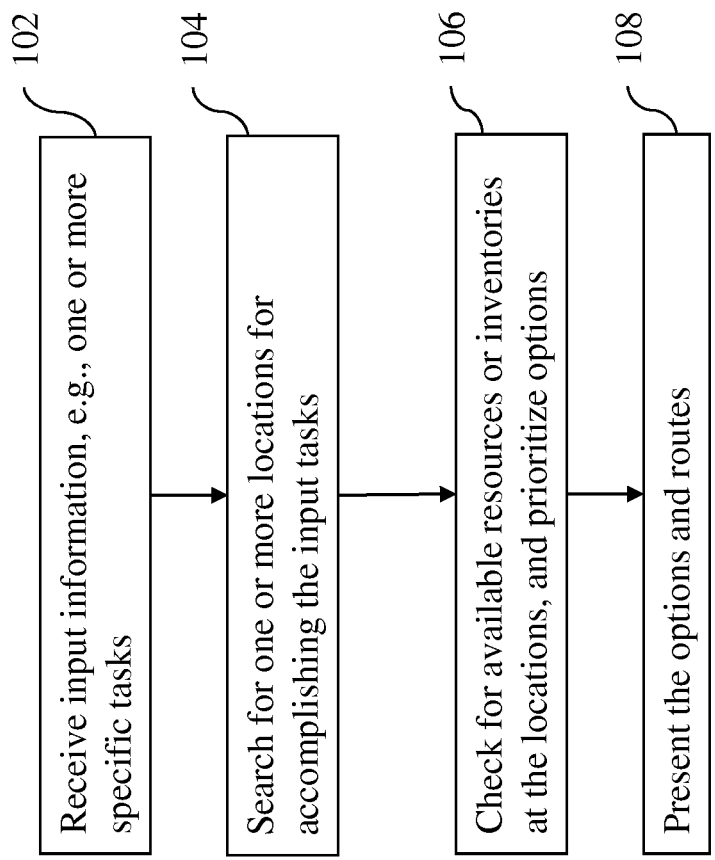
FIG. 1 illustrates an example operation of how routes can be determined dynamically based on inventories or resources at locations.

A methodology of the present disclosure in one embodiment may provide the ability to provide routes based on factors such as: specific errands and to-do items, current environmental conditions that lead to efficient routes, store inventory and status such as store hours (open and close times), the number of people on line, estimated wait time, user ratings, and other factors. For instance, a methodology of the present disclosure in one embodiment may allow a person to create a list of general or specific errands or to-do items (i.e., purchase groceries, purchase a new phone, buy gas) and receive a set of dynamic (meaning the route updates as the user continues to his/her destination and, for example, chooses to by-pass suggestions) en-route locations based on inventory (availability of product or service), efficiency (e.g., the grocery store with the shortest lines, the most efficient route or the route with the least traffic), specific rankings of the locations ranked by one or more users or other (e.g., 3-star, 4-star, e.g.: yelp-based rankings if available), other efficiency factors such as time, environmental sustainability, money, potential safety factors (e.g., driving and/or weather conditions, road conditions, traffic conditions). The present disclosure in one embodiment may take into account atmospheric conditions such as carbon dioxide level or pollen level or others, or combinations thereof, in areas in determining locations or routes (or both) through the areas. This, for instance, helps those with respiratory or allergic conditions. For instance, if a person has high allergic reactions to pollen, the dynamic routing methodology of the present disclosure may determine routes or locations that do not go through high pollen areas. Similar analogy may apply for those with respiratory conditions and areas with high carbon level. The user may receive the route updates dynamically, for example, while in transport (e.g., walking, driving, biking, or other), that is, on the way to a location, based on one or more of the above or other like factors.

In the present disclosure, a system and method may be provided that enable determination of intelligent routes via digital mapping systems such as GPS. Intelligent routes entail providing dynamic routes based on current factors such as current inventory of items specified in an errand list or to-do list, store status, or current environmental conditions such as traffic and weather, for example, which would allow users to receive more efficient, safer, and accurate routes, or any combinations thereof. Such a system and method also provide environmental benefits as this leads to less idling on the road and/or making multiple stops due to inventory shortages of items or other reasons. Intelligent routes also may take into account user generated rankings.

The system and method of the present disclosure in one embodiment also enable a user to enter or specify an activity, errand, and/or to-do list instead of specific location into a location device for determining a route to a location. For example, a user may enter, "purchase an iPhone" or "purchase Levi™'s jeans", instead of entering "Apple", "mall" "shopping center" or their addresses. In turn, the user en-route can receive "smart" routes based on the current state of the environment or other factors. Further, if there is a list of activities (e.g., errand 1, errand 2, . . . , errand n), a methodology of the present disclosure in one embodiment may provide an order of performing those activities based on the current conditions. For instance, it might detect that there is traffic in the route to performing errand 1, and therefore, the methodology may suggest completing errand 2 first, thereby leading to greater efficiency (e.g., in gas-mileage, lower costs, benefits to the environment, faster trips, less stress). In addition, the methodology of the present disclosure may determine and suggest a single location for multiple targets instead of separate locations for accomplishing each task, also resulting in more efficiency.

Yet in another aspect, if a user enters a location (e.g., grocery store), another location or other locations considered to be an alternate location may be provided, considering and based on factors, e.g., described above. For instance, another grocery store and a route to that grocery store may be suggested. A location may be considered an alternate, if they are in a similar category; for example, those that sell grocery items may be in the category of grocery stores, those that may sell hardware may be in the category of hardware stores, etc.

The methodology of the present disclosure in one embodiment allows a user en-route to receive "smart" routes based on inventory. For example, a user may specify the need to purchase a new iPhone™ or an iPad™, and based on the available item stocked in inventory and other factors such as the store hours and how busy the store is currently, a route may be specified that is the most efficient location with item in stock. Other considerations such as rankings (such as, does the store come highly recommended) set by users and others may be taken into account in providing the route.

FIG. 1 illustrates an example operation of how routes can be determined dynamically based on inventories or resources at locations. At 102, user specifies task(s), items, and/or locations or other information into a device such as a GPS device. Example inputs for specifying such tasks may include "buy iPhone", "go grocery shopping"; example inputs for specifying items may include "milk", "gas"; example inputs for specifying locations may include "Apple store", "grocery store". In another aspect, specific address of the location may be also entered.

At 104, the input information is used to search for locations. A device implementing a methodology of the present disclosure receives the user specified input information. In one embodiment, the methodology of the present disclosure may submit specific items one by one to a search engine based on user's current GPS coordinates and/or current address, for instance, using wireless local area network (e.g., WiFi) or other mobile communications technology (e.g., 3G, 4G, etc.), and receive nearest locations for the input item. In another embodiment, the user specified input information may be parsed for keywords (e.g., "iPhone", "grocery") which are then entered into a search query, e.g., using a search engine (e.g., Google™ search). For instance, if a user entered "go grocery shopping", keyword "grocery" may be used to search for grocery store locations. Yet in another embodiment, the device implementing the methodology of the present disclosure may be already connected to or has access to store databases that may include locations of the stores and inventories.

At 106, the inventories at the locations are checked for availability. For example, to determine the inventories at the locations, another search request may be submitted using, for example, existing search engines to determine if items are in stock. Such information may be obtained, for instance, on store's web sites which have pages showing "check inventory page" on line or "items remaining" or the like. In another aspect, the device may connect to existing inventory systems or database of the locations, and search for item(s) in the existing inventory system or database. Based on the inventory information and locations of the stores, and the current location of the user, the methodology of the present disclosure in one embodiment may prioritize n-number of options, e.g., locations may be assigned different priority based on the user's current geographic location and the inventory information.

In another embodiment, if a task to be performed needs service (e.g., rather than purchasing a product), the inventory or resources checked may include the number or amount of service that can be accommodated by the locations. In this disclosure, this checking by inventory is not limited only to purchasing of products. As an example, if one of the tasks specified is mailing a package at a post office, the methodology of the present disclosure may search for nearby post offices, open hours, and the size or the number of counter services available, and determine which post office would serve the user best, for instance, in terms of efficiency.

In one embodiment, a prioritized list of locations resulting from the search may be presented to the user, from which the user may select a location. In another embodiment, a list or prioritized locations along with the route information to the locations may be presented automatically. Thus, at 108, the device presents to a user one or more routes based on their assigned priorities to user-specified activities/locations. The routes may change or get updated according to user location.

Figure 2:
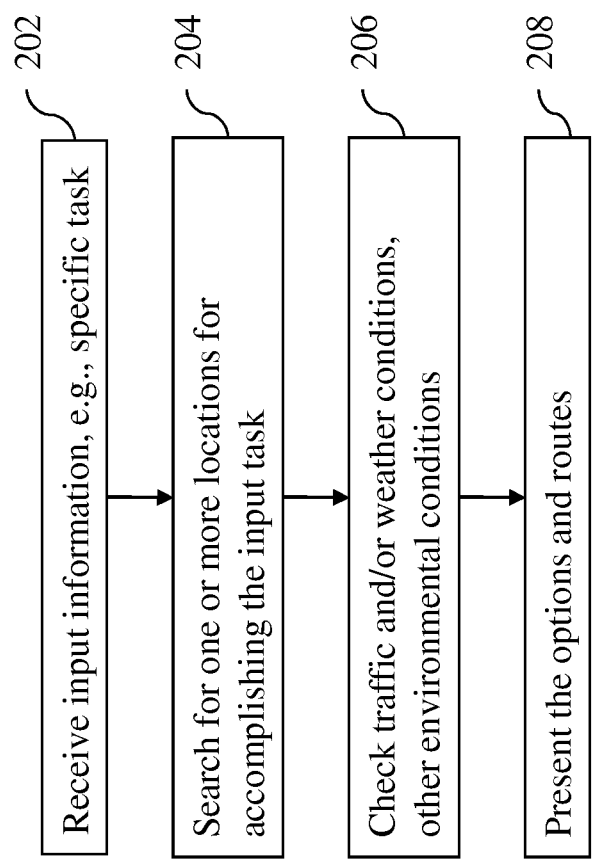
FIG. 2 illustrates an example operation of how routes based on traffic/external conditions such as weather may be determined dynamically in one embodiment of the present disclosure.

FIG. 2 illustrates an example operation of how routes based on traffic/external conditions such as weather may be determined dynamically in one embodiment of the present disclosure. At 202, a user specifies task(s), items, and/or locations or other information into a device such as a GPS device, for example, as in FIG. 1 at 102. At 204, the input information is used to search for locations, for example, as explained above with respect to 104 in FIG. 1.

At 206, traffic and/or weather conditions are checked. This may be accomplished in one aspect by looking up the information provided by the state departments of transportation (DOT) that provide current traffic conditions for given areas. The device, for instance, may have access to these systems via wireless local area network (e.g., WiFi) or other mobile communications technology (e.g., 3G, 4G, etc.). The methodology of the present disclosure in one embodiment may assign priorities to low traffic routes over high traffic routes via direct access to the database or by using a technique such as screen scraping.

At 208, the device presents users one or more routes based on assigned location priorities which were assigned based on the current traffic and/or weather conditions.

Figure 3:
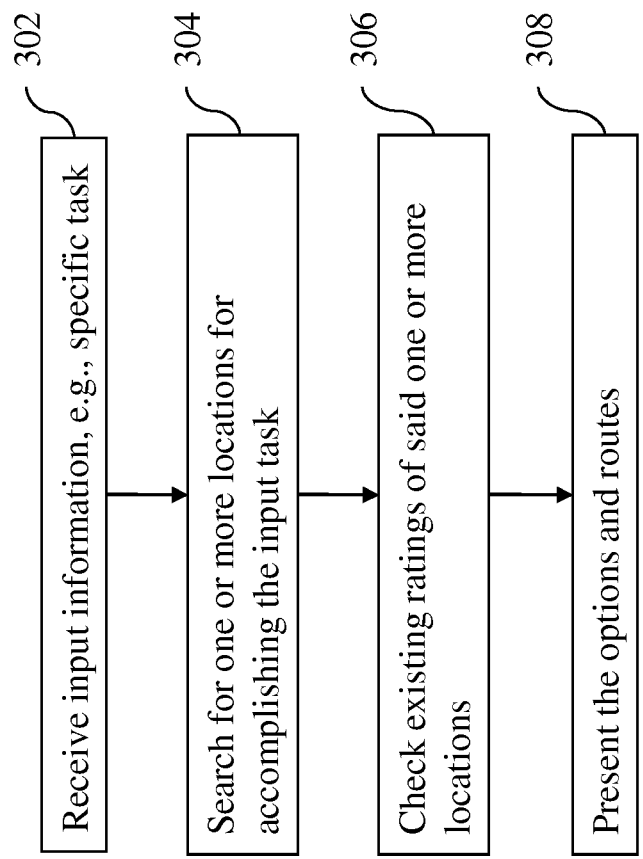
FIG. 3 shows an example operation of how routes based on preferences/user rankings may be determined dynamically in one embodiment of the present disclosure.

FIG. 3 shows an example operation of how routes based on preferences/user rankings may be determined dynamically in one embodiment of the present disclosure. At 302, a user specifies task(s), items, and/or locations or other information into a device such as a GPS device, for example, as in FIG. 1 at 102. At 304, the input information is used to search for locations, for example, as explained above with respect to 104 in FIG. 1.

At 306, existing ratings are checked, for example, using Yelp.com, or other on-line social networking resources that contain similar user data, or other databases or combinations thereof.

In one embodiment, combinations of different ratings from different databases may be utilized, for instance, statistical average or other statistical mean. The methodology of the present disclosure in one embodiment may assign priorities of the locations based on the number of star ratings given to a certain location. For example, high priority may be given to those locations with high number of star ratings; low priority may be given to those locations with low number of star ratings.

In one embodiment of the methodology of the present disclosure, one or more combinations of factors may be utilized to provide routes to the assigned locations. For instance, the combinations of steps 106 in FIG. 1, 206 in FIG. 2, and 306 in FIG. 3 may be used to provide one or more routes to a location, based on inventories, current conditions such as weather and/or traffic, rankings, and/or other environmental factors (e.g., carbon or other greenhouse gas level in the area, pollen level in the area, etc.). Briefly, greenhouse gases (sometimes abbreviated GHG) refer to gases that trap heat in the atmosphere. Primary greenhouse gases include carbon dioxide, methane, nitrous oxide, and ozone. Information about carbon dioxide emissions, levels of greenhouse gases and other such information may be retrieved from databases, government agency Web sites, and/or others.

The methodology of the present disclosure in one embodiment may allow for determination of efficient routes to take in performing tasks (or reaching one or more destinations associated with specified item(s) or location(s)), for example, by combining one or more of DOT or 511 data (traffic and travel information system), weather data, amount of carbon or other gas possibly emitted during traveling to the locations, amount of carbon or other greenhouse gases in the areas, for instance, for leading to a satisfied user experience. In addition, information such as any sales, coupons, or prices associated with the specified task or item, available at the locations may be used to prioritize which location would best serve the user. Such information may be obtained by performing an Internet search or database searches.

Figure 4:
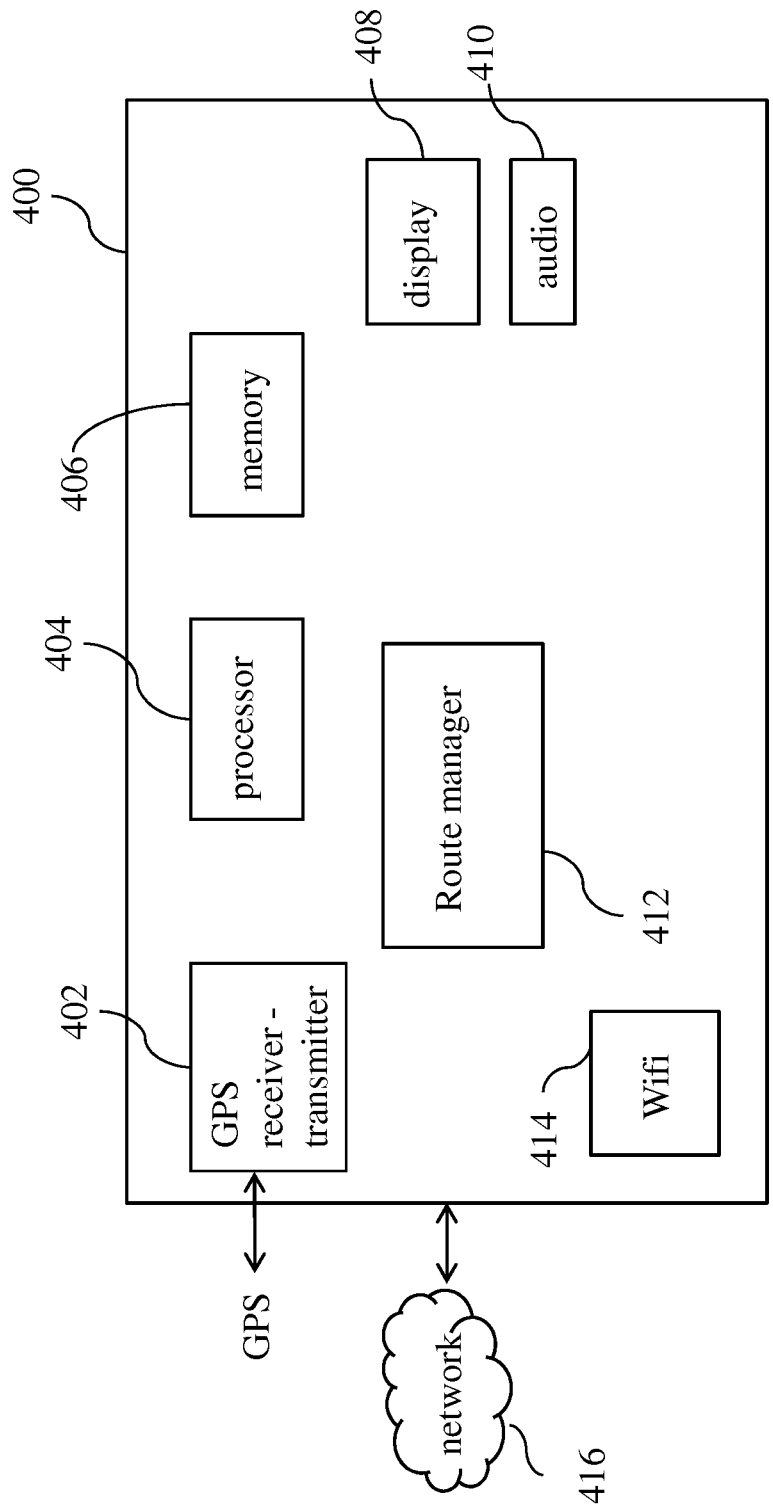
FIG. 4 illustrates a device which may implement a methodology of the present disclosure in one embodiment.

FIG. 4 illustrates a device which may implement the methodology of the present disclosure in one embodiment. A device 400 may be any portable device with location receiver/transmitter 402 such as GPS receiver/transmitter that can receive and transmit location information. The device 400 may include a processor or processing element 404, memory device 406, a display component 408, and audio component 410, communication elements such as WiFi device 414 and other wireless communication devices, and input device for receiving user inputs on the device. An example of such portable devices includes, but is not limited to, a cellular phone or a smart phone. Another example is a GPS device mountable or installed on a vehicle. A route manager component 412 may receive inputs from a user, for instance, specifying one or more tasks or destinations. The route manager component 412 may search for locations associated with the user input information, for example, wirelessly by performing a search via a network 416. The route manager component 412 may also search for information associated with the current weather, road and/or traffic conditions of the route to the locations. Other environmental information near the area may be obtained. The route manager component 412 may also obtain information relating to the currently available resources, inventory, or other factors at the locations. Based on the information obtained about the current conditions, the route manager component 412 may prioritize the locations or routes to the locations. The prioritized locations and/or routes may be presented to the user, e.g., via a display 408 and/or audio component 410.

The route manager component 412 may also present to the user the order in which a list of tasks may be performed or locations to visit, for instance, if the user entered more than one task, item or location (e.g., destination). The destinations (user entered and/or determined using the tasks entered) to visit may be ordered, for instance, to optimize user's time and resources spent in performing the tasks, based on for example, distance to the locations, the proximity of the locations, road/traffic conditions to the destinations, store hours, services available at each locations, and/or other factors.

In another aspect, a methodology of the present disclosure may consider levels of greenhouse gasses already in the area for determining routes. For instance, routes may be dynamically determined as to not exacerbate the greenhouse gases in the areas en-route to a location.

A user may input or specify more than one task, item, or list or combinations of thereof. For instance, a user may enter a list that includes multiple items, multiple, tasks, or multiple locations. As another example, a user may enter a list containing any combinations of one or more items, one or more tasks, one or more locations. A methodology of the present disclosure dynamically determines a route that includes the destinations for each (e.g., to get the specified item, to accomplish the specified task, to reach the specified or alternate location) based on one or more of the above-described factors or combinations of those factors. The route including the destinations is dynamically determined with the destinations being ordered in a manner that meets efficiency and/or safety criteria based on the current conditions or factors as described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for enabling dynamic routing information based on one or more user specified tasks, comprising:
   a location receiver;
   an input module operable to receive a plurality of user specified tasks;
   a routing manager module operable to determine one or more locations where said user specified tasks can be accomplished, and further dynamically determine at least one of routing and mapping information from current location of a user to said one or more locations,
   the routing manager module further operable to change dynamically an order of performing the specified tasks en route based on detecting current traffic condition,
   the routing manager module further operable to assign different priority to locations based on user's current geographic location and inventory information at the locations,
   the routing manager module further operable to suggest a single location for a multiple of the user specified tasks to be accomplished, and wherein at least one of the routing and the mapping information comprises the single location.

2. The system of claim 1, wherein the routing manager module obtains and uses current environmental conditions en-route to said one or more locations to dynamically determine at least one of routing and mapping information, obtains and uses information associated with currently available resources at said one or more locations to dynamically determine at least one of routing and mapping information, or obtains and uses ranking information associated with said one or more locations to dynamically determine at least one of routing and mapping information, or combinations thereof.

3. The system of claim 2, wherein the routing manager module obtains and uses currently available resources at said one or more locations to dynamically determine at least one of routing and mapping information, wherein the currently available resources include inventory information.

4. The system of claim 2, wherein the routing manager module obtains and uses current environmental conditions en-route to said one or more locations to determine at least one of routing and mapping information, wherein the environmental conditions include weather, amount of carbon to be emitted en-route to said one or more locations, level of greenhouse gases en-route to said one or more locations, traffic conditions en-route to said one or more locations, road conditions en-route to said one or more locations, amount of time it takes to travel to said one or more locations, or combinations thereof.

5. The system of claim 1, wherein the routing manager module dynamically determines at least one of routing and mapping information from current location of a user to said one or more locations based on sales, coupons, or price associated with the user specified tasks, or combinations thereof, available at said one or more locations.

6. The system of claim 1, wherein a plurality of tasks to be performed are received, and the routing manager module provides an order in which said plurality of tasks should be performed based on the dynamically determined at least one of routing and mapping information.

7. A non-transitory computer readable storage medium storing a program of instructions executable by a machine to perform a method of enabling dynamic routing based on one or more user specified tasks, comprising:
   receiving a plurality of user specified tasks;
   determining one or more locations where said user specified tasks can be accomplished;

dynamically determining at least one of routing and mapping information from current location of a user to said one or more locations;

changing dynamically an order of performing the specified tasks en route based on detecting current traffic condition; and assigning different priority to locations based on user's current geographic location and inventory information at the locations, wherein a single location is suggested for a multiple of the user specified tasks to be accomplished, and wherein at least one of the routing and the mapping information comprises the single location.

8. The computer readable storage medium of claim 7, wherein the step of dynamically determining includes using current environmental conditions en-route to said one or more locations to determine at least one of routing and mapping information, using information associated with currently available resources at said one or more locations to determine at least one of routing and mapping information, or using ranking information associated with said one or more locations, or combinations thereof.

9. The computer readable storage medium of claim 8, wherein the step of dynamically determining includes using currently available resources at said one or more locations to determine at least one of routing and mapping information, wherein the currently available resources include inventory information.

10. The computer readable storage medium of claim 8, wherein the step of dynamically determining includes using current environmental conditions en-route to said one or more locations to determine at least one of routing and mapping information, wherein the environmental conditions include weather, amount of carbon to be emitted en-route to said one or more locations, level of greenhouse gases en-route to said one or more locations, traffic conditions en-route to said one or more locations, amount of time it takes to travel to said one or more locations, or combinations thereof.

11. The computer readable storage medium of claim 7, wherein the step of dynamically determining includes dynamically determining at least one of routing and mapping information from current location of a user to said one or more locations based on sales, coupons, or price associated with the user specified tasks, or combinations thereof, available at said one or more locations.

12. The computer readable storage medium of claim 7, wherein the step of receiving includes receiving a plurality of tasks to be performed, and the method further includes providing an order in which said plurality of tasks should be performed based on the step of dynamically determining at least one of routing and mapping information from current location of a user to said one or more locations.

13. A non-transitory computer readable storage medium storing a program of instructions executable by a machine to perform a method of enabling dynamic routing, comprising:

receiving a plurality of user specified items;

determining one or more locations where said plurality of user specified items are available;

dynamically determining at least one of routing and mapping information from current location of a user to said one or more locations using current environmental conditions en-route to said one or more locations to determine at least one of routing and mapping information, using information associated with currently available resources at said one or more locations to determine at least one of routing and mapping information, or using ranking information associated with said one or more locations, or combinations thereof;

changing dynamically an order of performing the specified tasks en route based on detecting current traffic condition; and assigning different priority to locations based on user's current geographic location and inventory information at the locations, wherein a single location is suggested for a multiple of the user specified tasks to be accomplished, and wherein at least one of the routing and the mapping information comprises the single location.

14. The computer readable storage medium of claim 13, wherein if the determining one or more locations step determines a plurality of locations for said plurality of user specified items, determining and suggesting an order in which to travel to the plurality of locations and wherein said at least one or routing and mapping information includes the order.

15. The computer readable storage medium of claim 13, wherein the environmental conditions include weather, amount of carbon to be emitted en-route to said one or more locations, level of greenhouse gases en-route to said one or more locations, or combinations thereof.

* * * * *